(12) United States Patent
Muthusamy et al.

(10) Patent No.: US 12,309,035 B2
(45) Date of Patent: May 20, 2025

(54) ANALYSES AND TOPOLOGY VISUALIZATIONS OF NETWORK DEVICES AND NETWORKS

(71) Applicant: Arista Networks, Inc., Santa Clara, CA (US)

(72) Inventors: Karthikeyan Muthusamy, Tuticorin (IN); Abilash K. Menon, Bengaluru (IN); Payal Vrajlal Gothi, Vadodara (IN)

(73) Assignee: Arista Networks, Inc., Santa Clara, CA (US)

( * ) Notice: Subject to any disclaimer, the term of this patent is extended or adjusted under 35 U.S.C. 154(b) by 120 days.

(21) Appl. No.: 18/150,876

(22) Filed: Jan. 6, 2023

(65) Prior Publication Data

US 2024/0235943 A1 Jul. 11, 2024

(51) Int. Cl.
*G06F 15/173* (2006.01)
*H04L 41/12* (2022.01)
*H04L 41/14* (2022.01)

(52) U.S. Cl.
CPC ............. *H04L 41/12* (2013.01); *H04L 41/14* (2013.01)

(58) Field of Classification Search
CPC ................................ H04L 41/12; H04L 41/14
See application file for complete search history.

(56) References Cited

U.S. PATENT DOCUMENTS

| | | | |
|---|---|---|---|
| 10,944,628 B2 * | 3/2021 | Li | H04L 43/0817 |
| 2006/0277299 A1 * | 12/2006 | Baekelmans | H04L 41/064 |
| | | | 709/224 |
| 2015/0161386 A1 * | 6/2015 | Gupta | G06N 5/04 |
| | | | 726/22 |
| 2022/0014441 A1 * | 1/2022 | Sethi | H04L 41/145 |
| 2023/0188408 A1 * | 6/2023 | Pick | H04L 41/0627 |
| | | | 709/224 |
| 2024/0137289 A1 * | 4/2024 | Wu | H04L 43/08 |

* cited by examiner

*Primary Examiner* — Padma Mundur
(74) *Attorney, Agent, or Firm* — Tianyi He

(57) ABSTRACT

A method, network service, and non-transitory computer readable medium for analyzing and topologically visualizing network devices and networks. Network devices, and the networks formed therefrom, are often inflicted, in whole or in part, by any number of issues. Each issue, in turn, may refer to the inoperability, in whole or in part, of component(s) and/or feature(s) of the network devices and networks due to one or many trigger(s). Existing support strategies, for not only identifying, but also resolving, any issues manifesting on one or many network device(s), often tend to be predominantly manual in nature (e.g., extensively time-consuming and slow in yielding results) that involve teams of highly knowledgeable and skilled individuals tediously combing through copious and complex technical support data. In overcoming at least these shortfalls, embodiments disclosed herein approach issue identification and resolution through automated, analyses of network devices and/or networks.

20 Claims, 12 Drawing Sheets

Example Support Document 600

CPU: quad-core x86
System Memory: 16 GB
Packet Buffer Memory: 8 GB
Flash Storage Memory: 4 GB
Max 100GbE Ports: 12
Mgmt Ports: 1

①

...

AAA
ACL
BGP
IGMP
L2 Forwarding
L3 Forwarding
LLDP
MLAG
SNMP
VARP
VXLAN

②

...

Uptime: 26 days
Tasks: 358 total, 2 running, 356 sleeping
%CPU: 13
%Mem: 60
Ethernet1: up (25 days), connected
Ethernet2: down
PSU temp: 33C
PID 3152 %CPU 8 %Mem 44 Feat BGP
PID 1845 %CPU 5 %Mem 16 Feat AAA

③

...

Neighbor: discovered 25 days ago, MAC 90.2B.34.9E.0E.C0, TTL 121 seconds, via interface Ethernet1, protocol LLDP

④

...

Oct 01 03:06:21 %SYS-CONFIG: Configured from console by admin on vty0 (192.168.64.25)

Oct 02 08:01:13 %LINEPROTO-1-UPDOWN: Line protocol on interface Ethernet1, changed state to up Oct 08 06:13:28 %ACL-6-IPACCESS: list snmp_acl denied tcp 91.218.114.197 (57454) -> 152.32.245.126 (161)

Oct 14 05:22:58 %LINK-2-UPDOWN: Interface Ethernet2, changed state to down

Oct 20 08:39:10 %ACL-6-IPACCESS: list snmp_acl denied udp 195.180.143.77 (55236) -> 162.142.125.146 (2345)

Example Index-Pertinent Content 604

...

'CPU' | {'doc1': 4; [40, 2122, 2446, 2476]}

'quad-core' | {'doc1': 1; [45]}

'x86' | {'doc1': 1; [55]}

'sysmem-16gb' | {'doc1': 1; [58]}

'bufmem-8gb' | {'doc1': 1; [78]}

'flash-4gb' | {'doc1': 1; [94]}

'100gbeports-12' | {'doc1': 1; [120]}

'mgmtports-1' | {'doc1': 1; [140]}

'AAA' | {'doc1': 2; [540, 2485]}

'ACL' | {'doc1': 3; [543, 6224, 6352]}

Example Interpreter-Readable Support Data 602

ANALYSES AND TOPOLOGY VISUALIZATIONS OF NETWORK DEVICES AND NETWORKS

BACKGROUND

Network devices, and the networks formed therefrom, are often inflicted, in whole or in part, by any number of issues. Each issue, in turn, may refer to the inoperability, in whole or in part, of component(s) and/or feature(s) of the network devices and networks due to one or many trigger(s). In not only identifying, but also resolving, any issues that may manifest on a network device and/or network, teams of highly knowledgeable and skilled individuals are necessary.

BRIEF DESCRIPTION OF DRAWINGS

FIG. 6A shows an exemplary support document in accordance with one or more embodiments disclosed herein.

FIG. 6B shows exemplary interpreter-readable support data in accordance with one or more embodiments disclosed herein.

FIG. 6C shows exemplary index-pertinent content in accordance with one or more embodiments disclosed herein.

DETAILED DESCRIPTION

Figure 1:
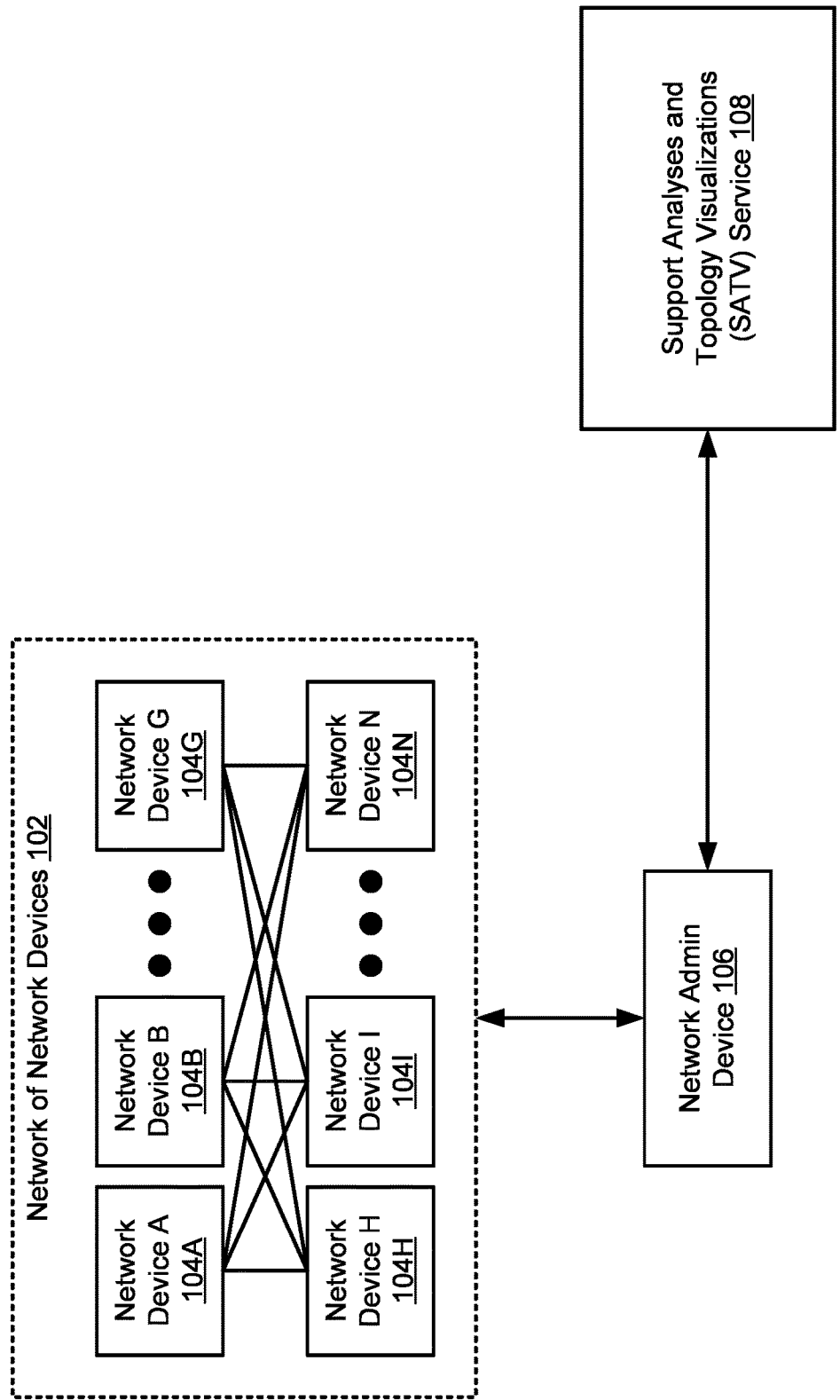
FIG. 1 shows a system in accordance with one or more embodiments disclosed herein.

Specific embodiments disclosed herein will now be described in detail with reference to the accompanying figures.

In general, embodiments disclosed herein relate to analyses and topology visualizations of network devices and networks. Network devices, and the networks formed therefrom, are often inflicted, in whole or in part, by any number of issues. Examples of said issues may include, but are not limited to: observed drops of network traffic packets; line card to fabric card connectivity disruptions caused by fair access policy (FAP) interrupts; observed virtual output queue (VOQ) delete drops indicative of the presence of state network traffic packets in the VOQ; observed limitations in implementing one or more networking protocols (with which a network device may be configured) due to an operating system of the network device not being up-to-date; and detected Layer-2 (L2), Layer-3 (L3) and/or link-aggregation (LAG) conflicts on one or more interfaces of the network device.

Furthermore, each issue, in turn, may refer to the inoperability, in whole or in part, of component(s) and/or feature(s) of the network devices and networks due to one or many trigger(s). Existing support strategies, for not only identifying, but also resolving, any issues manifesting on one or many network device(s), often tend to be predominantly manual in nature (e.g., extensively time-consuming and slow in yielding results) that involve teams of highly knowledgeable and skilled individuals tediously combing through copious and complex technical support data. In overcoming at least these shortfalls, embodiments disclosed herein approach issue identification and resolution through automated, analyses of network devices and/or networks.

Particularly, embodiments disclosed herein obtain support document(s), respective to reported issue(s) occurring on one or many network device(s); analyze the support document(s) (e.g., log files, configuration files, etc.) to identify network device configuration(s) and, subsequently, a set of enabled features of the network device(s) from the network device configuration(s); select a subset of analyzer classes from a set of analyzer classes, where an analyzer class in the subset of analyzer classes includes a set of analyzers pertinent to an enabled feature of the set of enabled features; perform, for each analyzer in the set of analyzers within each analyzer class in the subset of analyzer classes, an analysis on the support document(s) using the analyzer to obtain an analyzer result; and provide, at least concerning the reported issue(s), one or many support action(s) based on a collection of analyzer results that include an analyzer result for each analyzer in the set of analyzers within each analyzer class in the subset of analyzer classes.

The support action(s), furthermore, may include: presenting meaningful information relevant to the set of enabled features of the network device(s), including identified errors and warnings that may have triggered the reported, as well as one or many unreported (if any), issue(s); and presenting topology views centered around any given network device and/or a set of network devices (i.e., a network) that may also convey the aforementioned meaningful information regarding the network device(s). Embodiments disclosed herein also feature a repository for consolidating support documents and their metadata, which may be indexed and thus searchable through an issue relevant search engine.

In the following detailed description of the embodiments disclosed herein, numerous specific details are set forth in order to provide a more thorough understanding of the various embodiments. However, it will be apparent to one of ordinary skill in the art that the disclosure may be practiced without these specific details. In other instances, well-known features have not been described in detail to avoid unnecessarily complicating the description.

FIG. 1 shows a system in accordance with one or more embodiments disclosed herein. The system (100) may include a network of network devices (102), a network admin device (106), and a support analyses and topology visualizations (SATV) service (108). Each of these system (100) components is described below.

In one or more embodiments disclosed herein, the network of network devices (102) may represent a network topology of network devices (e.g., any number of network devices (104A-104N)) formed for the purpose of facilitating network connectivity (or connections) at least amongst each other. As used herein, the term connection, connecting, or connected, means there exists, between elements or components (and/or subcomponents), a direct or indirect connection that enables the elements/components/subcomponents to interact with one another in some way. For example, such elements/components/subcomponents may exchange information, send instructions to perform actions, cause changes in state and/or operating condition, etc. Additionally, as used herein, the network of network devices (102) may reflect an entire network or any portion thereof (e.g., a logical portion of the network devices (104A-104N) within the network topology). Further, the network of network devices (102) may include a datacenter network, a wide area network such as the Internet, a local area network, any other suitable network that facilitates the exchange of information from one part of the network of network devices (102) to another part, or any combination thereof.

In one or more embodiments disclosed herein, a network topology may refer to an arrangement or schema through which network devices (e.g., any number of network devices (104A-104N)) may be interconnected. By way of an example, a network topology may reflect a bipartite network topology, which includes at least two sets of network devices, with connections between network devices of one set and network devices of another set, but no connections between network devices within a given set. Examples of said bipartite network topologies may include, but may not be limited to, a folded three-stage Clos network topology (e.g., a spine-leaf network topology), a fat tree topology (i.e., a Leiserson network topology), etc. Further, a network topology may include network devices that may be highly interconnected, with, as an example, each network device in a first set of network devices being connected to each network device in a second set of network devices within the network topology. In the exemplary embodiment shown in FIG. 1, the network topology of the network of network devices (102) is a spine-leaf network topology. Further, although FIG. 1 shows an example of a spine-leaf network topology, in one or more embodiments disclosed herein, the network topology is not limited to reflecting a spine-leaf network topology (or the particular example shown), or any other example of a network topology set forth herein.

In one or more embodiments disclosed herein, in a spine-leaf network topology, the network of network devices (102) may be partitioned into a leaf layer and a spine layer. The leaf layer may encompass any number of network devices (e.g., network devices (104H-104N)) that provide network connectivity to any number of network endpoints (not shown). On the other hand, the spine layer may encompass any number of network devices (e.g., network devices (104A-104G)) that at least provide network connectivity between network devices of the leaf layer.

In one or more embodiments disclosed herein, in a spine-leaf network topology, each network device of the leaf layer (e.g., network devices (104H-104N)) may connect to each network device of the spine layer (e.g., network devices (104A-104G)); and, similarly, each network device of the spine layer may connect to each network device of the leaf layer.

In one or more embodiments disclosed herein, any network device (e.g., network devices (104A-104N)) may represent a physical device at least configured to facilitate communication and interaction between any number of network endpoints (not shown). Further, any network device may include and/or may connect to persistent storage (not shown), memory (e.g., random access memory (RAM)) (not shown), one or more computer processor(s) (e.g., integrated circuits) (not shown), and two or more physical network interfaces (also referred to as ports) (not shown).

In one or more embodiments disclosed herein, any network device (e.g., network devices (104A-104N)) may further include one or more network chips or network processors (not shown), which is/are separate component(s) from the computer processor(s) (e.g., central processing unit(s)) thereon. A network chip/processor may refer to any hardware (e.g., circuitry), software, firmware, and/or combination thereof that may include functionality to receive, process, and/or transmit network traffic based on a programmed configuration thereon. In order to perform such functionality, a network chip/processor may include any number of subcomponents, which may include, but may not be limited to, integrated circuit(s), buffer(s) (e.g., for implementing receive and/or transmit queues, such as virtual output queues (VOQs)), any type or amount of non-volatile storage, and/or any type or amount of volatile storage (e.g., RAM). Further, a network chip/processor may also include and/or connect to any number of physical network interfaces of a host network device. Such interfaces may provide a path external to the host network device (e.g., to other network devices and/or network endpoints), and/or may connect to other subcomponents internal to the host network device, where each such interface may function as an ingress and/or egress interface.

As a non-limiting example, a network chip/processor may represent hardware that receives network traffic (e.g., media access control (MAC) frames, Internet Protocol (IP) packets, etc.) at an ingress port, and determines out of which egress port(s) on the host network device to forward the network traffic.

In one or more embodiments disclosed herein, any network device (e.g., network devices (104A-104N)) may include functionality to receive network traffic (e.g., frames, packets, etc.) at any of the physical network interfaces (i.e., ports) of the network device, and to analyze the received network traffic in order to determine whether to: (i) drop the network traffic; (ii) process the network traffic; and/or (iii) transmit the network traffic, based on the processing, from one or more other physical network interfaces or ports of the network device in accordance with one or more embodiments described herein.

In one or more embodiments disclosed herein, any network device (e.g., network devices (104A-104N)) may also include functionality to store (e.g., in persistent storage, in memory, etc.) any number of data structures for facilitating operation of at least some aspects of the network device. Examples of such data structures may include, but may not be limited to, a routing information base (RIB) (not shown) and a forwarding information base (FIB) (not shown). Moreover, any network device may include software and/or firmware stored in any network device storage (not shown) and/or network device memory (not shown) (i.e., non-transitory computer readable mediums). Said software may include instructions which, when executed by the computer processor(s) of the network device, enable the computer processor(s) to perform operations in accordance with one or more embodiments described herein. The software instructions may take form as computer readable program code, which may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by the computer processor(s), is configured to perform functionality related to embodiments disclosed herein. The functionality of any network device is not limited to the aforementioned examples.

Examples of any network device (e.g., network devices (104A-104N)) may include, but may not be limited to, a network switch, a network router, a multilayer network switch, a fibre channel device, an InfiniBand® device, etc. Further, any network device is not limited to the aforementioned specific examples.

In one or more embodiments disclosed herein, the network admin device (106) may represent any physical appliance or computing system operated by one or many administrator(s) of the network of network devices (102). An administrator may refer to an individual or entity who may be responsible for overseeing network (102) operations and maintenance. To that end, at least as it pertains to embodiments disclosed herein, the network admin device (106) may include functionality to enable an administrator (or administrators) to interface, interact, or otherwise connect with/to the network of network devices (102) and the SATV service (108). One of ordinary skill, however, will appreciate that the network admin device (106) may perform other functionalities without departing from the scope of the disclosure. Examples of the network admin device (106) may include, but may not be limited to, a desktop computer, a laptop computer, a tablet computer, a network server, a smartphone, or any other computing system similar to the exemplary computing system illustrated and described with respect to FIG. 5, below.

Examples of activities through which the administrator(s) may interface, interact, or connect with/to the network of network devices (102) via the network admin device (106) may include, but may not be limited to: configuring one or many network device(s) (104A-104N); monitoring the operational state of one or many network device(s) (104A-104N); detecting inconsistencies in the monitored operational state of the network device(s) (104A-104N); generating one or many support document(s) (described below) for one or many network device(s) (104A-104N) in response to the detected inconsistencies; and re-configuring or updating one or many network device(s) (104A-104N) based on support action(s) (described below) meant to address at least a portion of the detected inconsistencies. Activities conducted by one or many administrator(s), via interfacing, interacting, or connecting with/to the network of network devices (102) using the network admin device (106), are not limited to the aforementioned specific examples.

Examples of activities through which the administrator(s) may interface, interact, or connect with/to the SATV service (108) via the network admin device (106) may include, but may not be limited to: submitting one or many support document(s) for one or many network device(s) (104A-104N) in response to detected inconsistencies in the monitored operational state of the network device(s) (104A-104N); receiving one or many support action(s), which may address at least a portion of the detected inconsistencies, from the SATV service (108); performing support document and/or network device issue searches through a search engine (see e.g., FIG. 2) implemented on the SATV service (108); and viewing, or otherwise being presented, topology visualizations encompassing one or many network device(s) (104A-104N). Activities conducted by one or many administrator(s), via interfacing, interacting, or connecting with/to the SATV service (108) using the network admin device (106), are not limited to the aforementioned specific examples.

In one or more embodiments disclosed herein, a support document may refer to data file, or a compressed (or archive) data file encompassing multiple data files, that may include various information useful for diagnostics, maintenance, and/or troubleshooting directed to a given network device (104A-104N). Said various information may include, but may not be limited to: a network device configuration associated with the given network device; a network device state (or operational state) associated with the given network device; network device connectivity information associated with the given network device; and network device logs associated with the given network device. Further, said various information is not limited to the aforementioned specific examples.

In one or more embodiments disclosed herein, the network device configuration, for any network device (104A-104N), may refer to a schema reflecting resources that may be installed, and features that may be enabled, on the network device (104A-104N). The aforementioned resources may include, but may not be limited to: compute resources (e.g., computer processor(s), network chip(s), etc.); storage resources (e.g., memory, persistent storage, etc.); and network resources (e.g., network communication hardware, network bandwidth, etc.). Furthermore, the aforementioned features may reference active functionalities driving operations on/by the network device (104A-104N). Said features or functionalities may, for example, pertain to: the network protocol(s) employed on/by the network device; the operating system and/or software application(s) executing on the network device; the broadcast domain(s) (if any) with which the network device is/are associated; and the network traffic filter(s), rule(s), and/or policy (policies) (if any) configured on the network device. Further, said features are not limited to the aforementioned specific examples.

In one or more embodiments disclosed herein, the network device state, for any network device (104A-104N), may refer to a schema reflecting a most recent or current operational status of various network device (104A-104N) components, as well as measurements and/or metrics respective to various properties quantified through various sensors operating on the network device (104A-104N). Said various components, of which operational statuses may be outlined in the network device state, may include, but may not be limited to, hardware or physical components (e.g., interfaces/ports, power supply, fans, integrated circuits, etc.); and software or logical components (e.g., operating system, agents, etc.). Furthermore, said various properties, with which measurements and/or metrics may be associated in the network device state, may include, but may not be limited to, temperature, motion, moisture, air flow, voltage, current, etc. Moreover, said various components and said various properties are not limited to the aforementioned specific examples.

In one or more embodiments disclosed herein, the network device connectivity information, for any network device (104A-104N), may refer to a schema reflecting connections between the network device (104A-104N) and other neighbor network device(s) (104A-104N) in the network of network devices (102). Said connections may include, but may not be limited to: layer-2 (L2) connections; layer-3 (L3) connections; and broadcast domain (e.g., virtual local area network (VLAN)) connections. Further, said connections are not limited to the aforementioned specific examples. Moreover, the network connectivity information may be attained by the network device (104A-104N) through any number of network protocols entailing connectivity information exchange with other neighbor network device(s) (104A-104N), such as the link-layer discovery protocol (LLDP).

In one or more embodiments disclosed herein, the network device logs, for any network device (104A-104N), may refer to a schema reflecting data records that may be generated throughout the operational life of the network device (104A-104N). Each data record may pertain to an event, an unexpected activity, or an inconsistency that had transpired, or may be transpiring, on the network device (104A-104N). Further, said event, unexpected activity, or inconsistency may, for example, entail one or many user(s) of, diagnostics collected for, maintenance performed on, or security intrusions detected on, the network device (104A-104N). Any said event, unexpected activity, or inconsistency is not limited to the aforementioned specific examples.

In one or more embodiments disclosed herein, a support action may refer to any activity directed to addressing the issue(s) (or at least a portion thereof) impacting one or many network device(s) (104A-104N). The issue(s) may encompass reported issue(s) for which support document(s) may be submitted to the SATV service (108) and/or unreported issue(s) that may be discovered through the analyses of the submitted support document(s). Examples of a support action may include, but may not be limited to: presenting meaningful information relevant to enabled feature set(s) of the network device(s), including the identification of errors and warnings that may have triggered the reported, as well as any unreported (if any), issue(s); presenting topology visualizations that may also convey the aforementioned meaningful information regarding any issue-inflicted network device(s) (104A-104N); and providing recommendations directed to resolving or temporarily circumventing any reported and/or unreported issue(s).

In one or more embodiments disclosed herein, the SATV service (108) may represent a network service directed to implementing analyses and topology visualizations of any one network device (104A-104N) and/or many network devices (104A-104N) that may form a network (e.g., network of network devices (102)). To that end, the SATV service (108) may include functionality to perform the method shown and described in further detail with respect to FIG. 4, below. One of ordinary skill, however, will appreciate that the SATV service (108) may perform other functionalities without departing from the scope of the disclosure.

In one or more embodiments disclosed herein, the SATV service (108) may be implemented through on-premises (i.e., datacenter) information technology (IT) infrastructure, cloud computing IT infrastructure, or any hybrid IT infrastructure thereof. The SATV service (108), accordingly, may be implemented using one or many network server(s) (not shown), where each network server may represent a physical or a virtual network server. Additionally, or alternatively, the SATV service (108) may be implemented using one or many computing system(s) similar to the exemplary computing system illustrated and described with respect to FIG. 5, below. Moreover, the SATV service (108) is shown and described in further detail with respect to FIG. 2, below.

In one or more embodiments disclosed herein, the above-mentioned system (100) components (or subcomponents thereof) may communicate with one another through a network (not shown) (e.g., a local area network (LAN), a wide area network (WAN) such as the Internet, any other network suitable for the exchange of information from any above-mentioned system (100) component to any other above-mentioned system (100) component(s), or any combination thereof). The network may be implemented using any combination of wired and/or wireless connections. Further, in communicating with one another, any of the above-mentioned system (100) components (or subcomponents thereof) may employ any combination of wired and/or wireless communication protocols.

While FIG. 1 shows a configuration of components and/or subcomponents, other system (100) configurations may be used without departing from the scope of the disclosure. For example, in one or more embodiments disclosed herein, the system (100) may include more than one network of network devices (not shown), where each other network of network devices may connect to, or be managed by, the network admin device (106) or more than one network admin device (not shown), respectively. Any additional network admin device may also connect to the SATV service (108).

Figure 2:
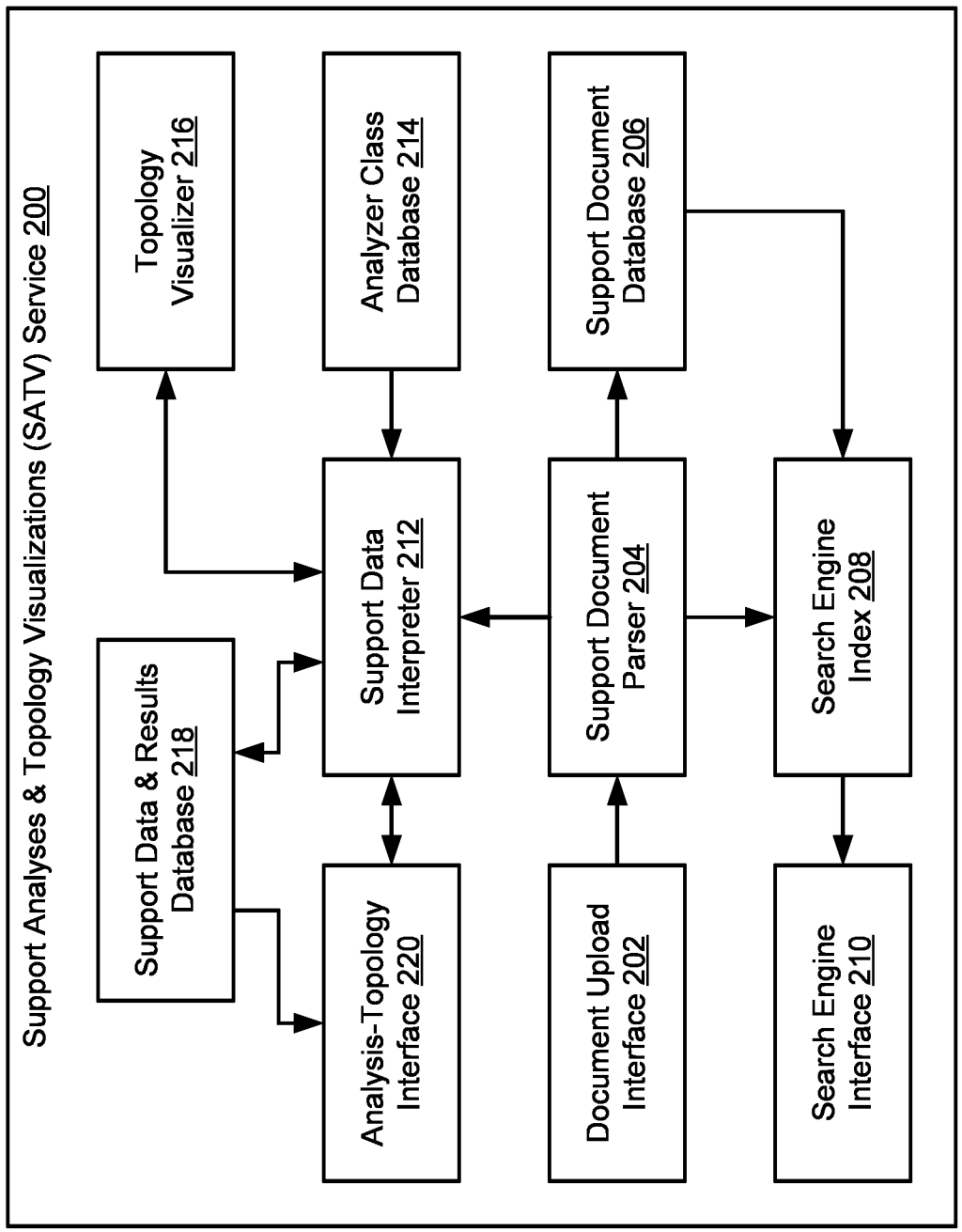
FIG. 2 shows a support analyses and topology visualizations service in accordance with one or more embodiments disclosed herein.

FIG. 2 shows a support analyses and topology visualizations (SATV) service in accordance with one or more embodiments disclosed herein. The SATV service (200) may include a document upload interface (202), a support document parser (204), a support document database (206), a search engine index (208), a search engine interface (210), a support data interpreter (212), an analyzer class database (214), a topology visualizer (216), a support data and results database (218), and an analysis-topology interface (220). Each of these SATV service (200) subcomponents is described below.

In one or more embodiments disclosed herein, the document upload interface (202) may refer to networking hardware (e.g., network card or adapter), a computer program implementing a logical interface (e.g., application programming interface (API)) that may execute on the underlying hardware of the SATV service (200), an interactivity protocol, or any combination thereof, that enables individuals or entities (e.g., network administrators, users, support specialists, etc.) to submit or upload one or many support document(s) (described above) (see e.g., FIG. 1). To that end, the document upload interface (202) may include functionality to: receive support document submission(s) pertaining to issues or inconsistencies occurring on one or many network device(s); and provide the received support document(s) to the support document parser (204) for analysis and/or processing. Further, one of ordinary skill will appreciate that the document upload interface (202) may perform other functionalities without departing from the scope of the disclosure.

In one or more embodiments disclosed herein, the support document parser (204) may refer to a computer program, or process(es) thereof, that may operate on the underlying hardware of the SATV service (200), which may implement and manage the role of parsing any received support document(s). To that end, the support document parser (204) may include functionality to: obtain one or many support document(s), which may pertain to issues or inconsistencies occurring on one or many network device(s), from the document upload interface (202); parse the obtained support document(s) to obtain interpreter-readable support data and index-pertinent content (both described below); update the support document database (206) to include the obtained support document(s); update the search engine index (208) to include the obtained index-pertinent content; and provide the obtained interpreter-readable support data to the support data interpreter (212) for analysis and/or processing. Said parsing of the obtained support document(s) may, for example, involve any existing algorithms employing syntactic analysis, natural language processing, tokenization, or any combination thereof. Further, one of ordinary skill will appreciate that the support document parser (204) may perform other functionalities without departing from the scope of the disclosure.

In one or more embodiments disclosed herein, interpreter-readable support data may refer to support data formatted for support data interpreter (212) readability. For example, any interpreter-readable support data may be reflected in any machine- or computer-readable data format, which may enable the support data interpreter (212) (e.g., implemented and supported through one or many computer processor(s) of the SATV service (200)) to analyze or process the interpreter-readable support data in order to fulfill its respective functionalities (described below). Said support data may refer to various information useful for diagnostics, maintenance, and/or troubleshooting directed to one or many network device(s), where said various information may include, but may not be limited to: one or many network device configuration(s); one or many network device state(s); network device connectivity information; and one or many network device log(s) (each described above with respect to FIG. 1). Further, said various information is not limited to the aforementioned specific examples.

In one or more embodiments disclosed herein, index-pertinent content may refer to information that may be used to populate the search engine index (208), which may optimize speed and performance directed to identifying one or many support document(s) (i.e., search engine query result(s)) relevant to any search engine queries posed through the search engine interface (210). Further, said information may depend on the architecture of the search engine index (208). For example, if the search engine index (208) is implemented as an inverted index, the index-pertinent content may include, but may not be limited to: one or many keyword(s); one or many document identifier(s) assigned to one or many support document(s); a keyword frequency, within each support document, associated with each keyword; and one or many keyword position(s), within each support document, associated with each keyword. Accordingly, an inverted index may refer to a data structure formed from one or many index entry (entries), where each index entry maps a keyword to one or many document(s) (e.g., support document(s)). This mapping alone may be considered insufficient for ranking the relevance of support document(s) that may be identified for a search engine query. Therefore, each index entry further specifies: the aforementioned keyword frequency to aid in relevance ranking; and the aforementioned keyword position(s) to identify word proximity in support of multi-word or phrase based search engine queries. The search engine index (208), implemented as an inverted index, is illustrated and described in further detail with respect to FIG. 3B, below.

In one or more embodiments disclosed herein, the support document database (206) may refer to a data repository, implemented and supported by the underlying hardware of the SATV service (200), which may store or consolidate a corpus of support documents, as well as any metadata descriptive thereof. The corpus of support documents may include any and all support documents ever submitted to the document upload interface (202) by any number of individuals or entities (e.g., network administrators, users, support specialists, etc.). The corpus of support documents may further pertain to any number of issues or inconsistencies that had occurred, or may be occurring, across any number of network devices. Moreover, the support document database (206) may be implemented, at least in part, using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiments disclosed herein, the search engine index (208) may refer to one or many data structure(s), implemented and supported by the underlying hardware of the SATV service (200), which may store index-pertinent content (described above). Said index-pertinent content may be used to optimize speed and performance related to the task(s) of identifying one or many support document(s) (consolidated in the support document database (206)) that may be relevant to any search engine query posed through the search engine interface (210). The search engine index (208), furthermore, may be implemented, at least in part, using persistent storage (see examples cited above with respect to the support document database (206)). In one or more embodiments disclosed herein, the search engine interface (210) may refer to networking hardware (e.g., network card or adapter), a computer program implementing a logical interface (e.g., application programming interface (API)) that may execute on the underlying hardware of the SATV service (200), an interactivity protocol, or any combination thereof, that enables individuals or entities (e.g., network administrators, users, support specialists, etc.) to submit search engine queries and receive search engine query results. To that end, the search engine interface (210) may include functionality to: receive one or many search engine query (queries), directed to one or many search engine context(s) (e.g., reported network device issue(s), network device configuration(s), enabled network device feature(s), support case or ticket identifier(s), etc.), from individuals/entities via a network admin device (see e.g., FIG. 1); process the search engine context(s) in view of index-pertinent content (described above) maintained in the search engine index (208) to identify one or many support document(s); retrieve the identified support document(s) from the support document database (206); and present (or otherwise provide) the retrieved support document(s), as one or many search engine query result(s), to the individuals/entities. Further, one of ordinary skill will appreciate that the search engine interface (210) may perform other functionalities without departing from the scope of the disclosure.

In one or more embodiments disclosed herein, the support data interpreter (212) may refer to a computer program, or process(es) thereof, that may operate on the underlying hardware of the SATV service (108), which may implement and manage the role of analyzing any interpreter-readable support data (described above). To that end, the support data interpreter (212) may include functionality to: obtain interpreter-readable support data from the support document parser (204); analyze or process the obtained interpreter-readable support data to at least identify and/or extract one or many network device configuration(s), one or many network device state(s), network device connectivity information, and/or one or many network device log(s); invoke the topology visualizer (216) to generate topology visualizations (see e.g., FIGS. 6D-6F) entailing one or many network device(s) based on the network device connectivity information; analyze or process the network device configuration(s) to identify and/or extract one or many set(s) of features (described above) (see e.g., FIG. 1) that may be enabled on one or many network device(s); map the set(s) of enabled features to subset(s) of analyzer classes, respectively, based on database entries maintained in the analyzer class database (214); perform analyses, using analyzer(s) in the subset(s) of analyzer classes, onto/of the identified network device configuration(s), network device state(s), and/or network device log(s) to produce one or many set(s) of analyzer results (see e.g., FIG. 6G); store the interpreter-readable support data, as well as the produced set(s) of analyzer results, in the support data and results database (218); and provide the produced set(s) of analyzer results, as well as any topology visualizations (generated by the topology visualizer (216)), to the analysis-topology interface (220) for individual/entity consumption. Further, one of ordinary skill will appreciate that the support data interpreter (212) may perform other functionalities without departing from the scope of the disclosure.

In one or more embodiments disclosed herein, the analyzer class database (214) may refer to a data repository, implemented and supported by the underlying hardware of the SATV service (200), which may store or consolidate network device features to analyzer class mappings. Any network device feature may reference an active or enabled functionality operating or configured on a network device, whereas an analyzer class may reference a group of analyzers directed to performing checks on interpreter-readable support data (described above) (or at least portions thereof) related or relevant to a given network device feature. Each said mapping, accordingly, may associate the group of analyzers, forming an analyzer class, with the given network device feature to which checks conducted by the group of analyzers are related/relevant. Moreover, the analyzer class database (214) may be implemented, at least in part, using persistent storage (see examples cited above with respect to the support document database (206)). The analyzer class database (214) is illustrated and described in further detail with respect to FIG. 3A, below.

In one or more embodiments disclosed herein, the topology visualizer (216) may refer to a computer program, or process(es) thereof, that may operate on the underlying hardware of the SATV service (200), which may implement and manage the role of generating (or otherwise rendering) topology visualizations entailing one or many network device(s). To that end, the topology visualizer (216) may include functionality to: obtain network connectivity information (described above) (see e.g., FIG. 1), pertinent to one or many network device(s), from the support data interpreter (212); generate one or many topology visualization(s) (see e.g., FIGS. 6D-6F), entailing connections stemming from and/or between the network device(s), based on the obtained network connectivity information; and provide the generated topology visualization(s) back to the support data interpreter (212) for eventual presentation to individuals/entities via the analysis-topology interface (220). Further, one of ordinary skill will appreciate that the topology visualizer (216) may perform other functionalities without departing from the scope of the disclosure.

In one or more embodiments disclosed herein, the support data and results database (218) may refer to a data repository, implemented and supported by the underlying hardware of the SATV service (200), which may store or consolidate a collection of interpreter-readable support data (described above), as well as a collection of analyzer results. The collection of interpreter-readable support data may include any and all interpreter-readable support data ever obtained through parsing of any and all support documents ever submitted. Meanwhile, the collection of analyzer results may include any and all analyzer results ever produced by the support data interpreter (212). Moreover, the support data and results database (218) may be implemented, at least in part, using persistent storage (see examples cited above with respect to the support document database (206)).

In one or more embodiments disclosed herein, the analysis-topology interface (220) may refer to networking hardware (e.g., network card or adapter), a computer program implementing a logical interface (e.g., application programming interface (API)) that may execute on the underlying hardware of the SATV service (200), an interactivity protocol, or any combination thereof, that enables individuals or entities (e.g., network administrators, users, support specialists, etc.) to view, be presented with, or otherwise interact with, any analyzer result(s) (see e.g., FIG. 6G) and topology visualization(s) (see e.g., FIGS. 6D-6F) produced through analyses performed on any submitted support document(s) (and any derivative information thereof). To that end, the analysis-topology interface (220) may include functionality to: obtain one or many set(s) of analyzer results, as well as one or many topology visualization(s), from the support data interpreter (212) and/or the support data and results database (218); create graphical user interfaces (GUIs); populate the GUIs using the obtained set(s) of analyzer results and/or topology visualization(s) (or at least portions thereof) to produce informed GUIs; present (or otherwise provide) the informed GUIs to any connected individuals/entities; and handle individual/entity interactions with the presented, informed GUIs through data seeking and retrieval, as well as informed GUI modifications, as needed. Further, one of ordinary skill will appreciate that the analysis-topology interface (220) may perform other functionalities without departing from the scope of the disclosure.

While FIG. 2 shows a configuration of components and/or subcomponents, other SATV service (200) configurations may be used without departing from the scope of the disclosure.

Figure 3A:
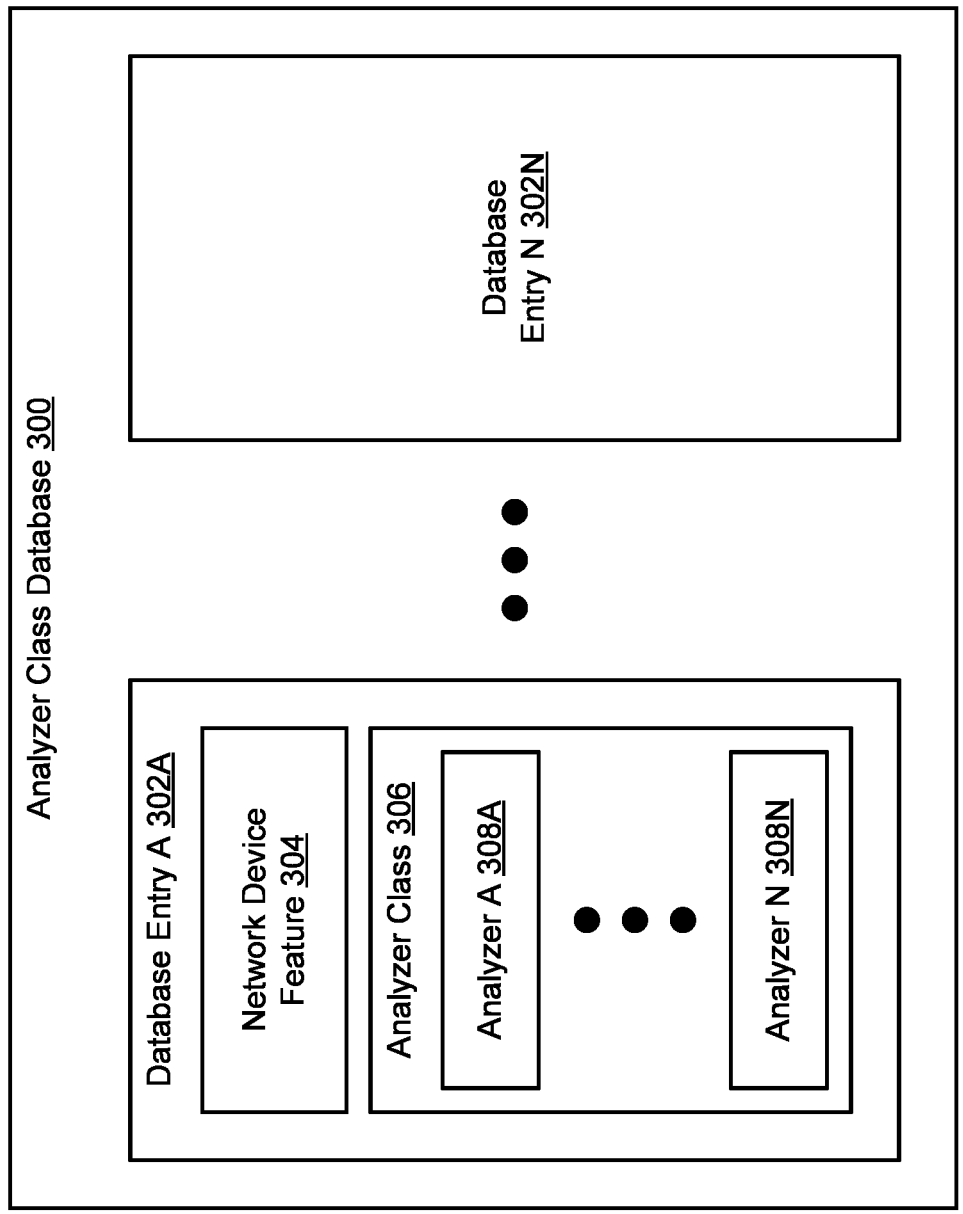
FIG. 3A shows an analyzer class database in accordance with one or more embodiments disclosed herein.

FIG. 3A shows an analyzer class database in accordance with one or more embodiments disclosed herein. The analyzer class database (300) may include one or many database entry (entries) (302A-302N). Each database entry (302A-302N), subsequently, may include a network device feature (304) and an analyzer class (306). Each of these database entry (302A-302N) subcomponents is described below.

In one or more embodiments disclosed herein, the network device feature (304) may reference an active or enabled functionality operating or configured on a network device. Further, the aforementioned active/enabled functionality may, for example, pertain to: a network protocol employed on/by the network device; an operating system or a software application executing on the network device; a broadcast domain (if any) with which the network device may be associated; and a network traffic filter, rule, or policy (if any) configured on the network device. The network device feature (304) is not limited to the aforementioned specific examples.

In one or more embodiments disclosed herein, the analyzer class (306) may reference a group of analyzers (308A-308N) that may be applied towards the performance of checks related or relevant to the network device feature (304). Each analyzer (308A-308N) may refer to a computer program, or computer readable program code/instructions, which may implement a predefined algorithm. The predefined algorithm, when applied or invoked, may perform a simple check (e.g., including a singular check step) or a complex check (e.g., including multiple check steps) pertinent to the network device feature (304). Simple checks may, for example, entail data retrieval tasks, such as identifying or obtaining a particular value disclosed in: the network device configuration (e.g., available memory capacity); the network device state (e.g., port status, central processing unit (CPU) temperature); and/or the network device log (e.g., frequency of security intrusions per specified period of time). On the other hand, complex checks may, for example, entail multiple data retrieval tasks interleaved with any number of mathematical operations (e.g., addition, subtraction, multiplication, division), conditional operations (e.g., if-then, if-then-else, switch-select-case), advanced logic operations (e.g., machine learning, artificial intelligence), any other decision-making operations, or any combination thereof.

By way of a non-limiting example, an analyzer class (306), and thus the network device feature (304), may pertain to the border gateway protocol (BGP). Analyzers (308A-308N), under said analyzer class (306), may at least include: (i) a first analyzer that may check whether there are any BGP neighbors configured with loopback as a source interface and not configured with external BGP (EBGP) multi-hop; (ii) a second analyzer that may check whether there are any BGP access control list (ACL) configured interfaces; (iii) a third analyzer that may check whether Internet Protocol (IP) routing is disabled; (iv) a fourth analyzer that may check whether any source interfaces are down when BGP is enabled; (v) a fifth analyzer that may check whether any confederation peers are configured without a confederation identifier when BGP is enabled; (vi) a sixth analyzer that may check whether any aggregate addresses are also present in static routes; (vii) a seventh analyzer that may check whether IP version 6 (IPv6) routing is disabled when BGP is configured in a default IPV6 unicast state and/or whether there are any IPv6 configured neighbors; (viii) an eighth analyzer that may check whether are any route maps or prefix lists applied under BGP that are not actually configured; (ix) a ninth analyzer that may check whether any BGP neighbors are not established; (x) a tenth analyzer that may check whether BGP is shutdown; (xi) an eleventh analyzer that may check whether any BGP processes are inactive in IP version 4 (IPv4) and/or IPv6 instances when BGP is enabled; and (xii) a twelfth analyzer that may check the memory availability should a maximum number of routes are configured for peers. Analyzers (308A-308N), respective to BGP, are not limited to the aforementioned specific examples.

While FIG. 3A shows a configuration of components and subcomponents, other analyzer class database (300) configurations may be used without departing from the scope of the disclosure.

Figure 3B:
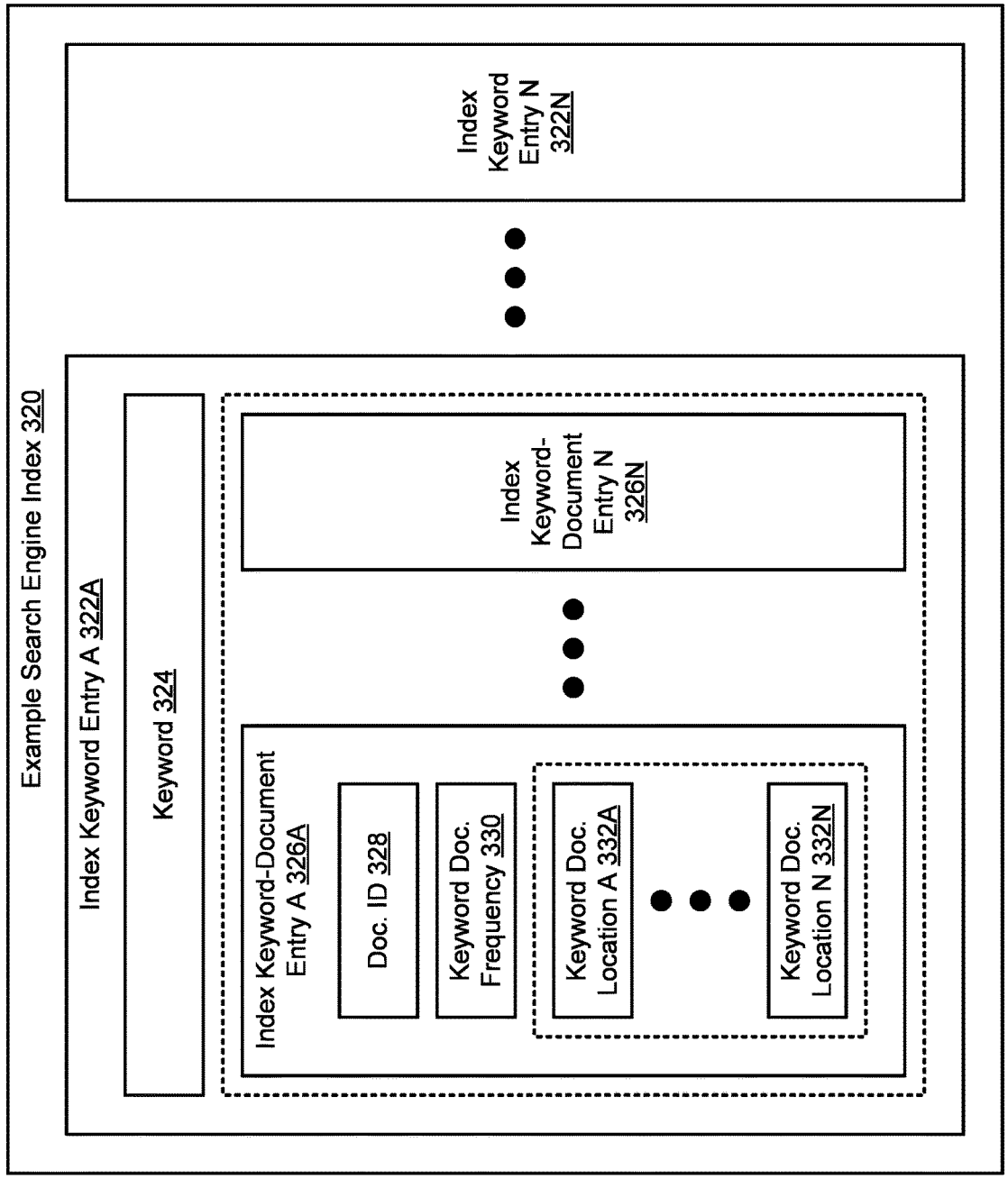
FIG. 3B shows an exemplary search engine index in accordance with one or more embodiments disclosed herein.

FIG. 3B shows an exemplary search engine index in accordance with one or more embodiments disclosed herein. The exemplary search engine index (320) may reflect an inverted index architecture. To that end, the exemplary search engine index (320) may include one or many index keyword entry (entries) (322A-322N), where each index keyword entry (322A-322N) may pertain to a keyword (described below) that may be disclosed, or derived from content disclosed, in one or many support document(s). Subsequently, each index keyword entry (322A-322N) may include a keyword (324) and one or many index keyword-document entry (entries) (326A-326N). Each of these index keyword entry (322A-322N) subcomponents is described below.

In one or more embodiments disclosed herein, the keyword (324) may refer to a unique term (e.g., a single word) or a unique phrase (e.g., multiple words) that captures context significant or relevant to one or many support document(s). The keyword (324) may represent any arbitrary-sized contiguous text that may be found, or derived from, within the support document(s). Further, said context significant/relevant to the support document(s) may include, but is not limited to, network device configuration(s); network device state(s); network device connectivity information; and network device log(s).

In one or more embodiments disclosed herein, an index keyword-document entry (326A-326N) may pertain to a support document wherein the keyword (324) may be found, or where-from the keyword (324) may be derived. Accordingly, an index keyword-document entry (326A-326N) may include a document identifier (ID) (328), a keyword document frequency (330), and one or many keyword document location(s) (332A-332N). Each of these index keyword-document entry (326A-326N) subcomponents is described below.

In one or more embodiments disclosed herein, the document ID (328) may refer to any arbitrary-sized character string that uniquely identifies a support document. Further, said character string may include any combination of letters, numbers, and/or symbols.

In one or more embodiments disclosed herein, the keyword document frequency (330) may refer to a numerical value that reflects a number of times that the keyword (324) appears in the support document associated with the document ID (328). Alternatively, the keyword document frequency (330) may refer to a numerical value that instead reflects a number of times that certain text within the support document, and used to derive the keyword (324), appears in the support document.

In one or more embodiments disclosed herein, a keyword document location (332A-332N) may refer to a numerical value that reflects an offset indicating a starting location/position of the keyword (324), or of text used to derive the keyword (324), within the support document associated with the document ID (328). Said offset may stand relative to a starting location/position of the support document. Further, said offset may be expressed in any appropriate distance or displacement unit such as, for example, in bytes or characters.

While FIG. 3B shows a configuration of components and subcomponents, other search engine index (320) configurations may be used without departing from the scope of the disclosure.

Figure 4:
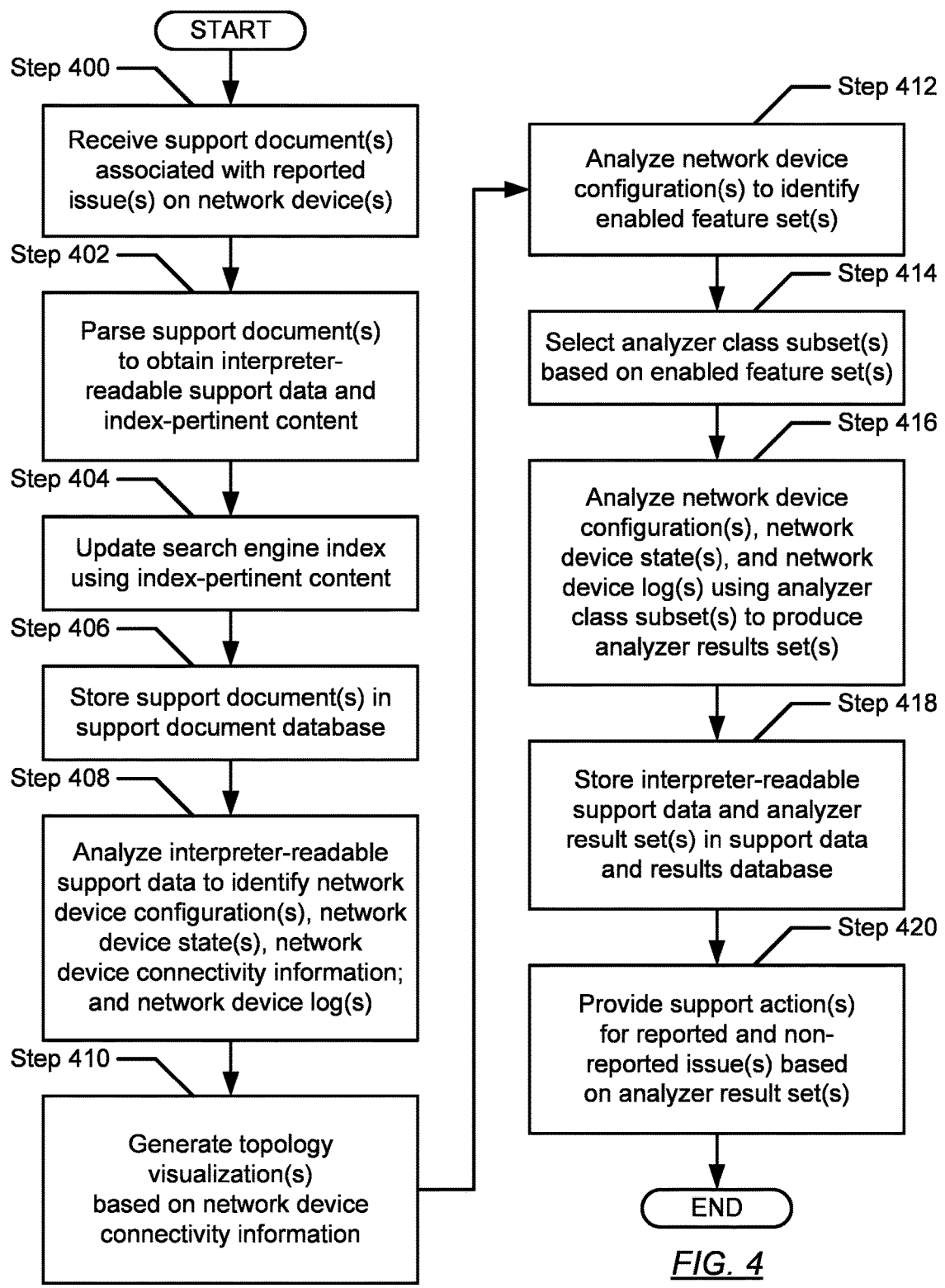
FIG. 4 shows a flowchart describing a method for implementing analyses and topology visualizations of network devices and networks in accordance with one or more embodiments disclosed herein.

FIG. 4 shows a flowchart describing a method for implementing analyses and topology visualizations of network devices and networks in accordance with one or more embodiments disclosed herein. The various steps outlined below may be performed by the support analyses and topology visualizations (SATV) service (or by the underlying hardware thereof) (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, one or many support document(s) is/are received. In one or more embodiments disclosed herein, each support document may be associated with a given network device. That is, if one support document is received, then the one support document is associated with one network device. On the other hand, if multiple support documents are received, then the multiple support documents are associated with multiple network devices, respectively. Further, each support document may further be associated with at least one reported issue concerning the network device respective to the support document. By way of examples, a reported issue (or any issue for that matter) concerning a network device may include, but are not limited to: observed drops of network traffic packets; line card to fabric card connectivity disruptions caused by fair access policy (FAP) interrupts; observed virtual output queue (VOQ) delete drops indicative of the presence of state network traffic packets in the VOQ; observed limitations in implementing one or more networking protocols (with which the network device may be configured) due to an operating system of the network device not being up-to-date; and detected Layer-2 (L2), Layer-3 (L3) and/or link-aggregation (LAG) conflicts on one or more interfaces of the network device. In order to address the at least one reported issue, a support document may include various information useful for network device diagnostics, maintenance, and/or troubleshooting. An exemplary support document is illustrated and described in further detail with respect to FIG. 6A, below.

In Step 402, the support document(s) (received in Step 402) is/are analyzed. Particularly, in one or more embodiments disclosed herein, each support document may be parsed to obtain interpreter-readable support data and index-pertinent content. Further, said parsing of the support document(s) may, for example, involve any existing algorithms employing syntactic analysis, natural language processing, tokenization, or any combination thereof. Exemplary interpreter-readable support data and index-pertinent content are illustrated and described in further detail with respect to FIGS. 6B and 6C, respectively, below.

In Step 404, the above-mentioned search engine index (see e.g., FIG. 2) is updated using the index-pertinent content (obtained in Step 402). In one or more embodiments disclosed herein, updating the search engine index with the index-pertinent content may enable the support document(s) (received in Step 400) to be returned as search results (or at least a portion thereof) to future search queries made by individuals/entities (e.g., network administrators, users, support specialists, etc.) seeking past references citing similar reported issue(s) or other relevant context.

Thereafter, in Step 406, a support document database (see e.g., FIG. 2) is updated to include the support document(s) (received in Step 400).

In Step 408, the interpreter-readable support data (obtained in Step 402), associated with each support document (received in Step 400), is analyzed. In one or more embodiments disclosed herein, for each support document, analysis on/of the respective interpreter-readable support data may yield a network device configuration, a network device state, network device connectivity information, and a network device log—all for the network device with which the support document may be associated.

In Step 410, one or many topology visualization(s) is/are generated. That is, in one or more embodiments disclosed herein, any topology visualization may refer to a connected graph that includes a set of nodes, representing a set of network devices, interconnected by a set of edges representing connections between the set of network devices (or any subset thereof). Should a number of the support document(s) (received in Step 400) equal one, then the topology visualization(s) may include a network device topology, or a device-centric connected graph (e.g., star topology) focused around the network device with which the received support document is associated (see e.g., FIG. 6D), and their connection(s) to any number of neighbor network device(s).

Alternatively, should a number of the support document(s) (received in Step 400) exceed one, then the topology visualization(s) may include: an aforementioned network device topology (see e.g., FIG. 6D) for each different network device associated with the many received support documents; a network subset topology (see e.g., FIG. 6E), or subset-centric connected graph (e.g., mesh topology) focused around the many network devices associated with the many received support documents, respectively, as well as their connections to one another and any number of neighbor network device(s) (i.e., network devices that exclude any other network device of the aforementioned many network devices); and/or a featured network subset topology (see e.g., FIG. 6F), or feature-centric connected graph (e.g., mesh topology) focused around at least a subset of the aforementioned many network devices, where the at least subset of many network devices are each configured with a selected (enabled) feature of interest, where the featured network subset topology further conveys the connections between the at least subset of many network devices to one another and any number of neighbor network device(s), as well as feature metadata, or information descriptive of the selected (enabled) feature of interest. Furthermore, the generated topology visualization(s) may be derived from the network device connectivity information (identified in Step 408).

In one or more embodiments described herein, any generated topology visualization(s) may serve as an interactive, visual tool through which network administrators, users, support specialists, etc., may view and engage with in order to better understand the affected network, as well as to assist in the investigation of at least the reported issue(s).

In Step 412, the network device configuration(s) (identified in Step 408) is/are analyzed. In one or more embodiments disclosed herein, the analysis (analyses) may yield the identification of an enabled feature set for each network device configuration of the network device configuration(s). For a given network device, the enabled feature set may refer to a schema reflecting features (described above) (see e.g., FIG. 3A) found to be active or enabled on the given network device (at least at the point-in-time that the associated support document had been created and submitted).

In Step 414, for each enabled feature set (identified in Step 412), an analyzer class subset is selected. In one or more embodiments disclosed herein, selection of the analyzer class subset may rely upon mappings stored in an analyzer class database (see e.g., FIG. 2), which may associate network device features to analyzer classes.

In Step 416, the network device configuration(s), network device state(s), and/or network device log(s) (obtained in Step 408) are analyzed using the analyzer class subset(s) (selected in Step 414). That is, in one or more embodiments disclosed herein, each analyzer class subset may be applied to a corresponding information set including a network device configuration, a network device state, and/or a network device log—where the applied analyzer class subset and the corresponding information set are associated with a given support document (received in Step 400) that pertains to a given network device.

Further, in applying an analyzer class subset to a respective information set, an analyzer result set may be produced. An analyzer result set, in turn, may reference and thus may include an analyzer result for each analyzer in the group of analyzers forming each analyzer class in the applied analyzer class subset (selected in Step 414). The analyzer result, for any given analyzer, may depend on the check performed by the given analyzer. By way of examples, any analyzer result may be reflected as any one of the following data types: a Boolean value (e.g., one or zero representing true or false), a numerical value, a categorical value (e.g., to convey multi-state information or classifications), etc. Moreover, any analyzer result is not limited to the aforementioned specific examples.

In Step 418, the interpreter-readable support data (obtained in Step 402) and the analyzer result set (produced in Step 416), derived from each support document of the support document(s) (received in Step 400), are subsequently stored in the support data and results database (see e.g., FIG. 2).

In Step 420, one or many support action(s) is/are provided. In one or more embodiments disclosed herein, a support action may refer to any activity that may assist a network administrator, a user, a support specialist, etc., in addressing the issue(s) (or at least a portion thereof) impacting one or many network device(s). The issue(s) may encompass reported issue(s) associated with the support document(s) (received in Step 400), and/or unreported issue(s) that may be discovered through the analyses of the support document(s) (as described through the method herein). See, e.g., FIGS. 6A-6G.

Examples of a support action may include, but may not be limited to: presenting meaningful information relevant to enabled feature set(s) of the network device(s), including the identification of errors and warnings that may have triggered the reported, as well as any unreported (if any), issue(s); presenting the topology visualization(s) (generated in Step 410) that may also convey the aforementioned meaningful information regarding any issue-inflicted network device(s); and providing recommendations directed to resolving or temporarily circumventing any reported and/or unreported issue(s).

Figure 5:
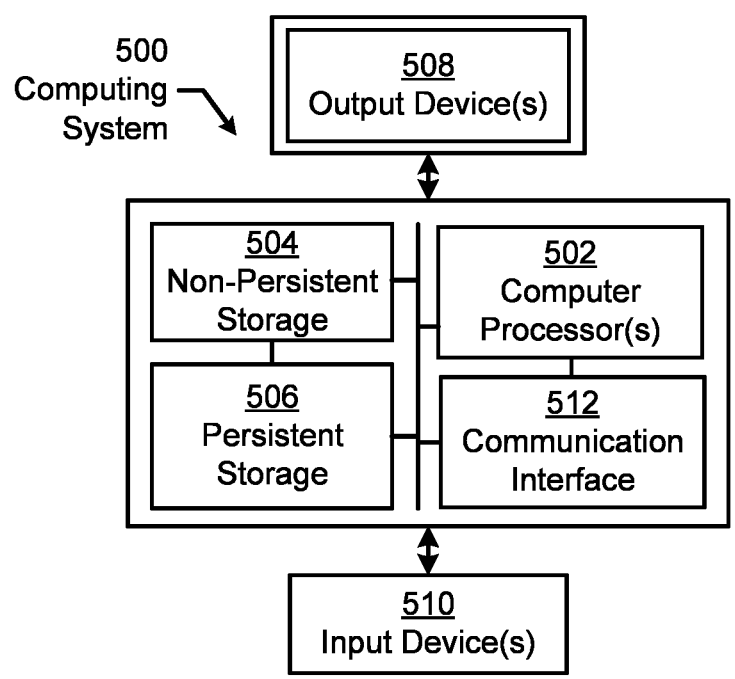
FIG. 5 shows an exemplary computing system in accordance with one or more embodiments disclosed herein.

FIG. 5 shows an exemplary computing system in accordance with one or more embodiments disclosed herein. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or more embodiments disclosed herein, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one or more embodiments disclosed herein, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform one or more embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Throughout FIGS. 6A-6G, consider an exemplary scenario where a network device, within a network belonging to an organization, is found, by an admin thereof, to be experiencing an issue pertinent to the border gateway protocol (BGP) being implemented thereon. As a first step to address or resolve the issue (i.e., a reported issue), the admin generates a support document (see e.g., FIG. 6A) associated with the network device and, subsequently, submits said support document to the SATV Service (see e.g., FIGS. 1 and 2) for analysis. A progression of said analysis, in accordance with embodiments disclosed herein, is described hereinafter with respect to FIGS. 6A-6G. Further, the following exemplary analysis is presented for explanatory purposes only and not intended to limit the scope of the disclosure.

Turning to FIG. 6A, the support document (also referred to hereinafter as the exemplary support document) (600), which had been submitted by the above-mentioned admin of an affected network device, describes various information useful for diagnostics, maintenance, and/or troubleshooting directed to said affected network device. The aforementioned various information include (1) resources available on the network device (as part of a network device configuration thereof), (2) features enabled on the network device (as a remaining part of the network device configuration thereof), (3) network device state of the network device, (4) network device connectivity information of the network device, and (5) a network device log of the network device.

Once received, the SATV Service proceeds to parse the exemplary support document (600) in order to obtain interpreter-readable support data.

Turning to FIG. 6B, the interpreter-readable support data (also referred to hereinafter as the exemplary interpreter-readable support data) (602) represents a conversion of the exemplary support document (600) (see e.g., FIG. 6A), which had been expressed in a human-understandable format, to machine- or computer-readable code, such as binary code (which is shown herein). Said machine/computer-readable code may represent a low-level language that a support data interpreter (described above) (see e.g., FIG. 2) of the SATV Service may comprehend and process in order to achieve its respective functionalities.

Furthermore, in parsing the exemplary support document (600), the SATV Service also obtains index-pertinent content.

Turning to FIG. 6C, the index-pertinent content (also referred to hereinafter as the exemplary index-pertinent content) (604) includes a collection of entries each citing a keyword, a document ID, a keyword document frequency, and one or more keyword document locations (all described above) (see e.g., FIG. 3B). The collection of entries shown herein derive from the exemplary support document (600) (see e.g., FIG. 6A). Further, using at least this collection of entries, a search engine index (described above) (see e.g., FIG. 2) may be populated/updated, thereby enabling the exemplary support document (600) to be referenced amongst search results to future search queries surrounding similar or relevant context.

Thereafter, the SATV Service analyzes the exemplary interpreter-readable support data (602) (see e.g., FIG. 6B) to identify the network device configuration of the network device, the network device state of the network device, the network device connectivity information of the network device, and the network device log of the network device. Topology visualizations are subsequently generated based on the identified network device connectivity information. Further, these topology visualizations are presented to the admin through one or more graphical user interfaces (GUIs), thereby enabling the GUI(s) to serve as an interactive, visual tool through which the admin can better understand the connectivity of the affected network and better troubleshoot the reported issue.

Figure 6D:
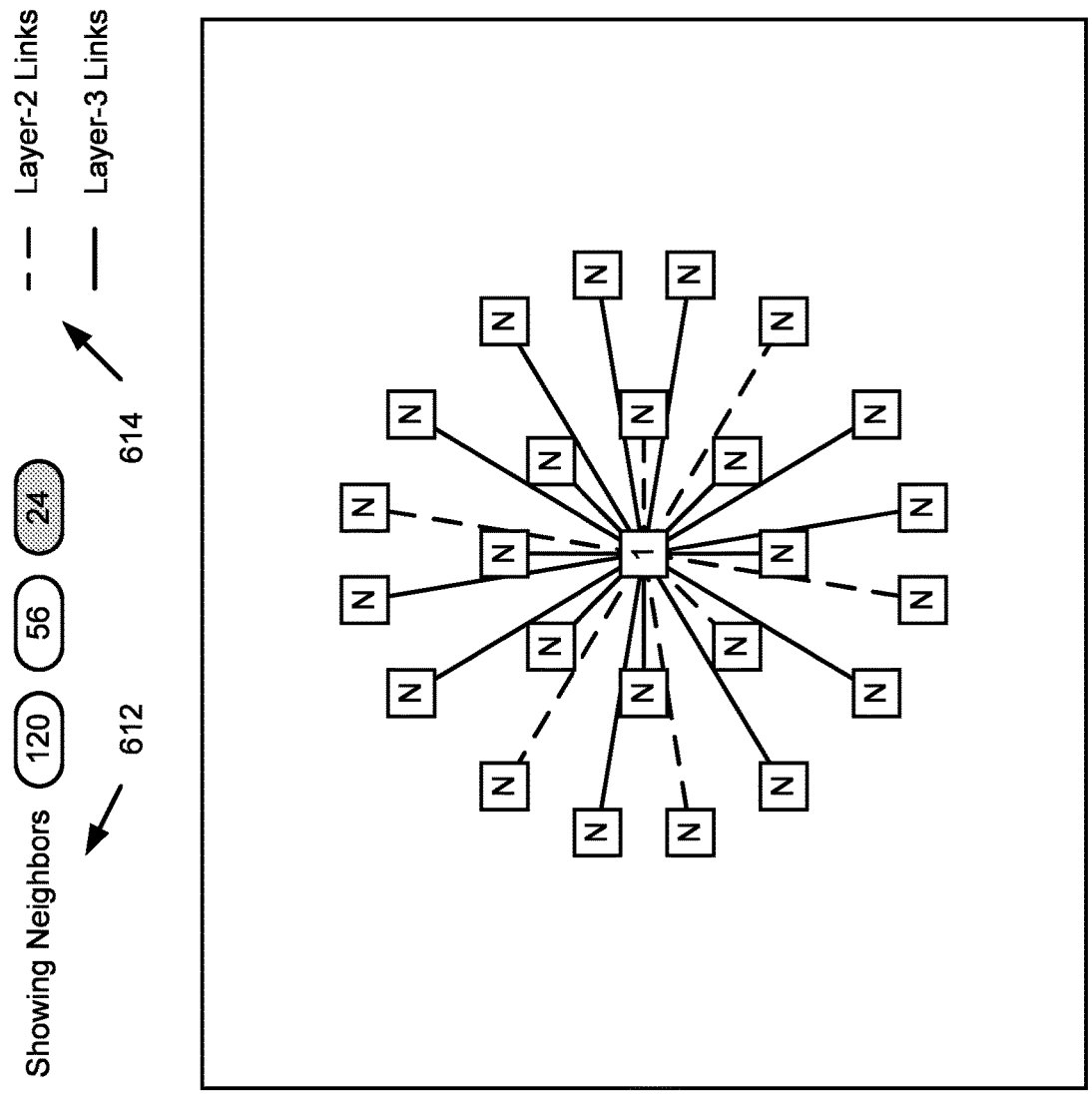
FIGS. 6D-6F show exemplary graphical user interfaces for viewing topology visualizations in accordance with one or more embodiments disclosed herein.
Figure 6D:
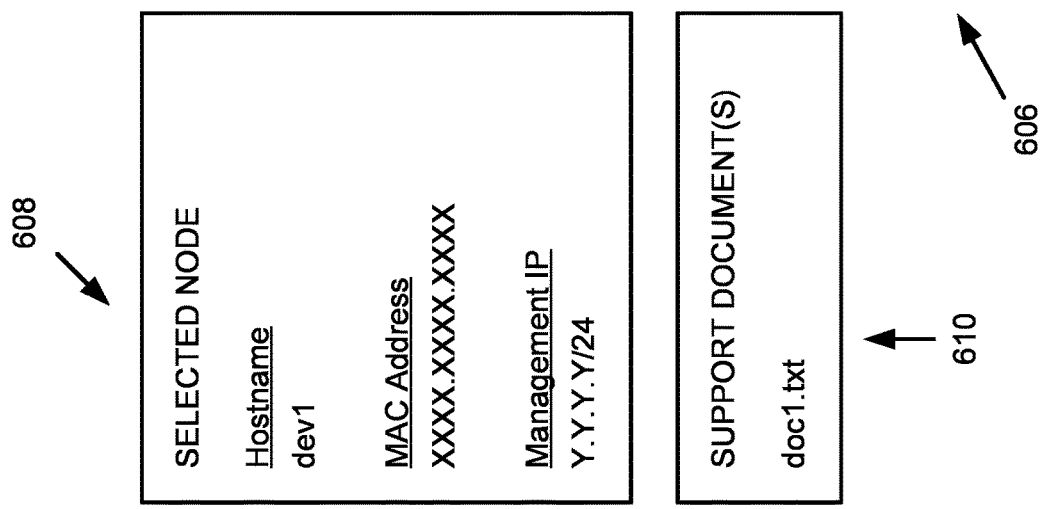

Turning to FIG. 6D, a GUI (also referred to hereinafter as an exemplary GUI) includes a topology visualization window (606). The topology visualization window (606) represents a space where one or many topology visualization(s) may be presented. In the exemplary topology visualization window (606) shown herein, the portrayed topology visualization is representative of a device-centric connected graph (e.g., a star topology), which focuses around the affected network device (denoted by the boxed 1 in the topology visualization) with which the exemplary support document (600) is associated, and their connections to any number of neighbor network devices (each denoted by a boxed N in the topology visualization).

The exemplary GUI further includes a selected node information window (608). The selected node information window (608) represents a space where various identification information, concerning a selected node (i.e., the affected network device), is displayed. In the exemplary selected node information window (608) shown herein, the various displayed identification information includes a hostname for the affected network device, a media access control (MAC) address for the affected network device, and a management IP address assigned to the affected network device.

The exemplary GUI further includes a support document(s) window (610). The support document(s) window (610) represents a space where one or many support document(s), responsible for the data shown in the exemplary GUI, is/are listed. In the exemplary support document(s) window (610) shown herein, the filename of a single support document or data file (i.e., the exemplary support document (600) (see e.g., FIG. 6A)) is displayed.

The exemplary GUI further includes a set of radio buttons (612). The set of radio buttons (612) represents an interactive element through which the admin can select the number of neighbor network devices (each denoted by a boxed N in the topology visualization shown in the topology visualization window (606)) that are to form, at least in part, the topology visualization. In the exemplary set of radio buttons (612) shown herein, there are three options a user may select from, which pertain to the number of neighbor network devices that can be shown in the topology visualization. Of the available options, the one option selected by the user at any given point-in-time is highlighted, colored, or otherwise emphasized (i.e., 24 neighbor network devices).

The exemplary GUI further includes a legend window (614). The legend window (614) represents a space where a set of legend keys, descriptive of one or many element(s) shown in the topology visualization(s) (portrayed in the topology visualization window (606)), is/are presented. In the exemplary legend window (614) shown herein, the set of legend keys include: a first line style (i.e., dashed line) associated with a first subset of edges, representative of Layer-2 (L2) links or connections, between the affected network device (denoted by the boxed 1 in the topology visualization) and a first subset of the any number of neighbor network devices (each denoted by a boxed N in the topology visualization); and a second line style (i.e., solid line) associated with a second subset of edges, representative of Layer-3 (L3) links or connections, between the affected network device and a second subset of the any number of neighbor network devices.

Figure 6E:
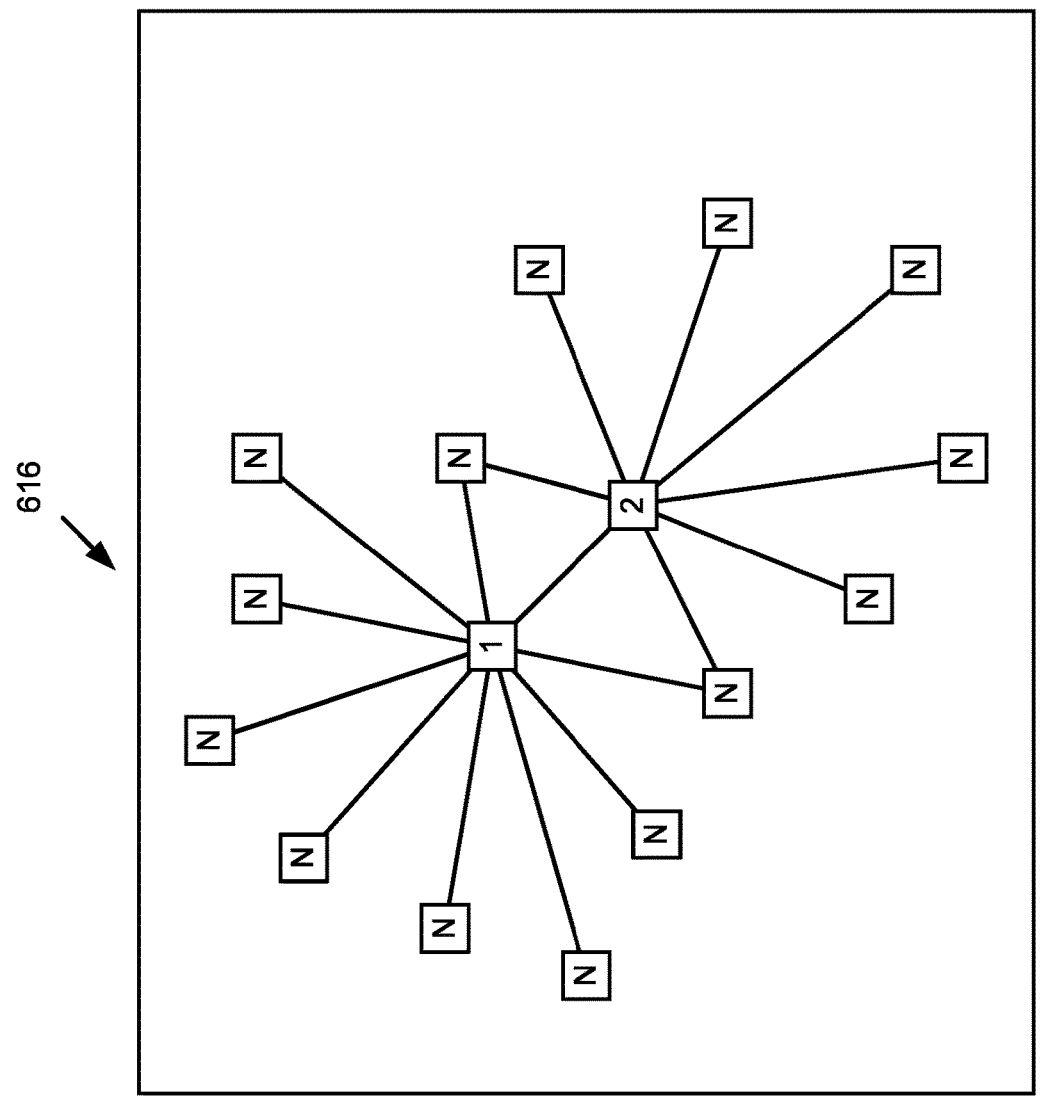
Figure 6E:
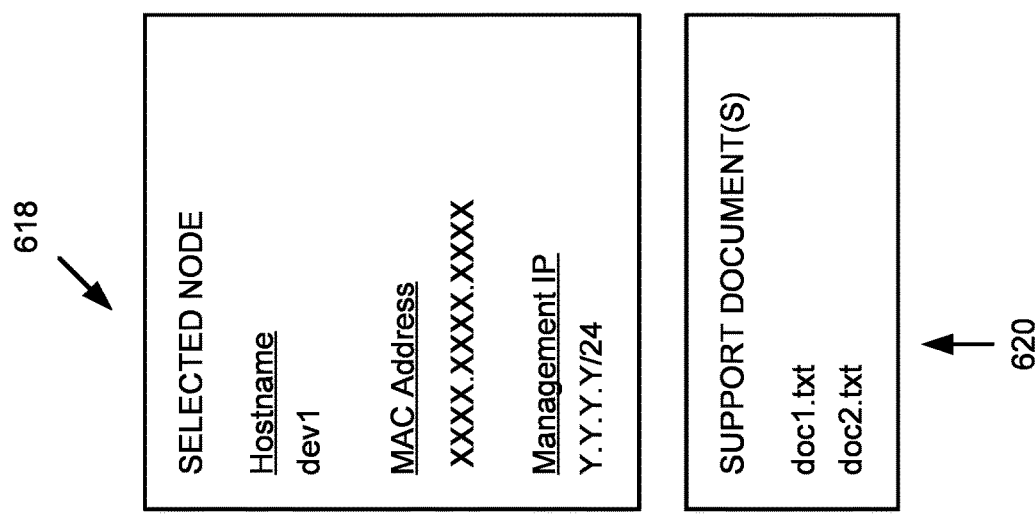

Turning to FIG. 6E, the exemplary GUI is slightly different from its previous presentation in FIG. 6D. Nevertheless, the exemplary GUI, portrayed herein, includes a topology visualization window (616) (described above). The topology visualization window (616), as shown herein, portrays a topology visualization representative of a subset-centric connected graph (e.g., mesh topology), which focuses around multiple network devices (denoted by the boxed 1 and the boxed 2 in the topology visualization) for which a support document, respective to each, may have been submitted for analyses, and their connections to one another as well as to any number of neighbor network devices (each denoted by a boxed N in the topology visualization) that may or may not be shared there-between.

The exemplary GUI further includes a selected node information window (618) and a support document(s) window (620), which are substantially similar to the same named components disclosed in FIG. 6D, above. In the exemplary support document(s) window (620) shown herein, however, the filenames of two support documents or data files are displayed, where the filename "doc1.txt" and "doc2.txt" each pertain to the affected network device, which is denoted by the boxed 1 in the topology visualization.

Figure 6F:
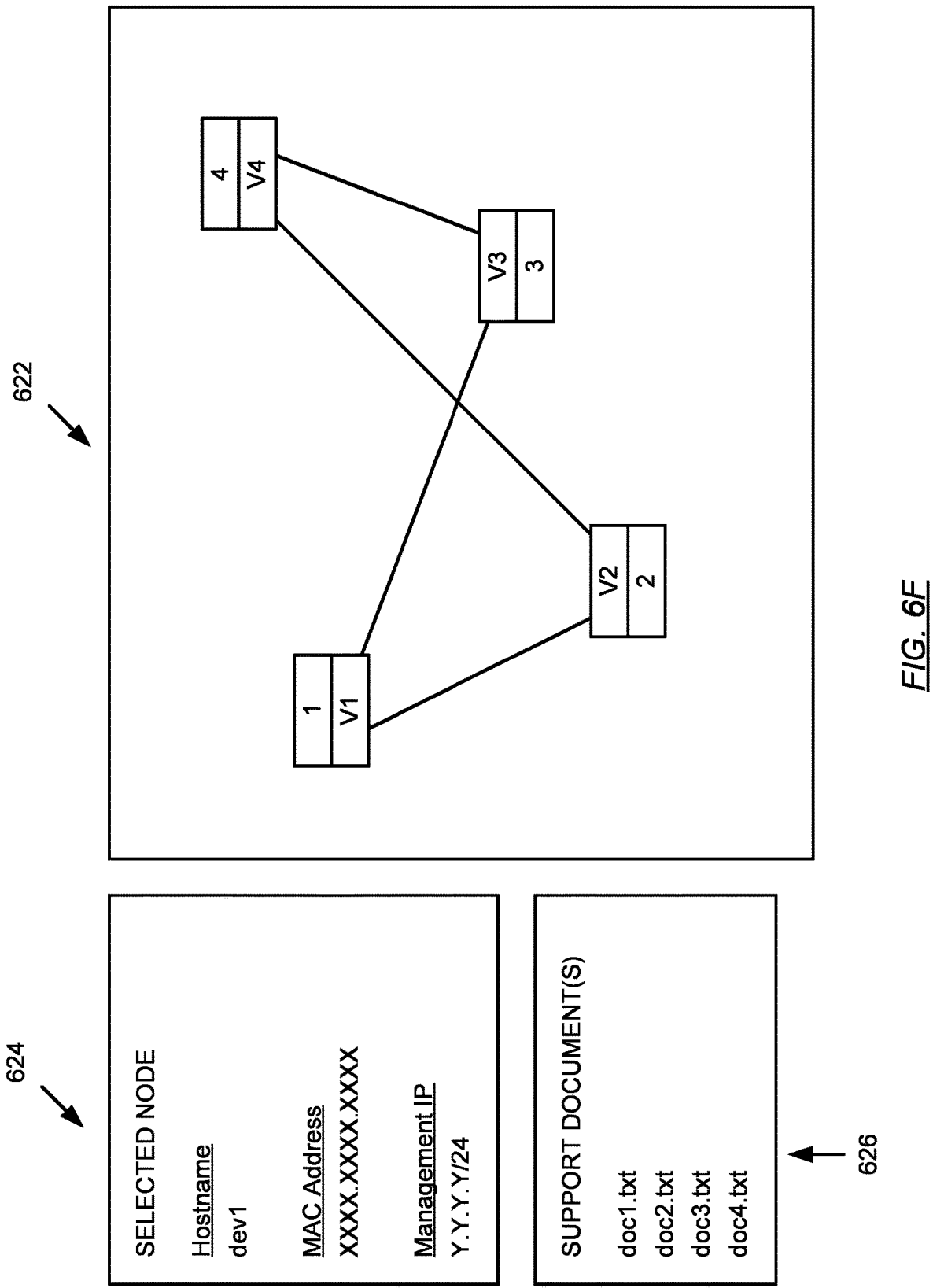

Turning to FIG. 6F, the exemplary GUI is again slightly different from its previous presentations in FIGS. 6D and 6E. Nevertheless, the exemplary GUI includes a topology visualization window (622) (described above). The topology visualization window (622), as shown herein, portrays a topology visualization representative of a feature-centric connected graph (e.g., VXLAN, MLAG, LLDP, etc.), which focuses around multiple network devices (denoted by the boxed 1, the boxed 2, the boxed 3, and the boxed 4 in the topology visualization) for which a support document, respective to each, may have been submitted for analyses, and their connections to one another in view of a selected (enabled) feature of interest configured there-across.

The selected (enabled) feature of interest portrayed here pertains to the virtual extensible local area network (VXLAN) encapsulation protocol. As such, the topology visualization further depicts virtual tunnel endpoints (VTEPs) (denoted by the boxed V1, V2, V3, and V4), each serving as an encapsulation point for the VXLAN protocol, on each of the multiple network devices shown (denoted as 1, 2, 3, and 4).

The exemplary GUI further includes a selected node information window (624) and a support document(s) window (626), which are substantially similar to the same named components disclosed in FIG. 6D or 6E, above. In the exemplary support document(s) window (626) shown herein, however, the filenames of four support documents or data files are displayed, where the filenames "doc1.txt", "doc2.txt", "doc3.txt", and "doc4.txt" each pertain to the affected network device, which is denoted by the boxed 1 in the topology visualization.

Following generation of the topology visualizations, the SATV Service continues by analyzing the identified network device configuration to obtain an enabled feature set corresponding to the feature(s) discovered to be enabled on the affected network device. Subsequently, based on the enabled feature set, an analyzer class subset is selected, which is/are, in turn, employed in the analyses of the identified network device configuration, network device state, and network device log, to produce an analyzer result set. Support actions, in the form of at least presenting detected error(s), warning(s), and/or other useful information detail(s) via another GUI, are provided based on the produced analyzer result set. Said GUI may therefore serve as another interactive, visual tool through which the admin can not only identify, and attempt to address/resolve, the reported issue, but also any unreported issue(s) too.

Figure 6G:
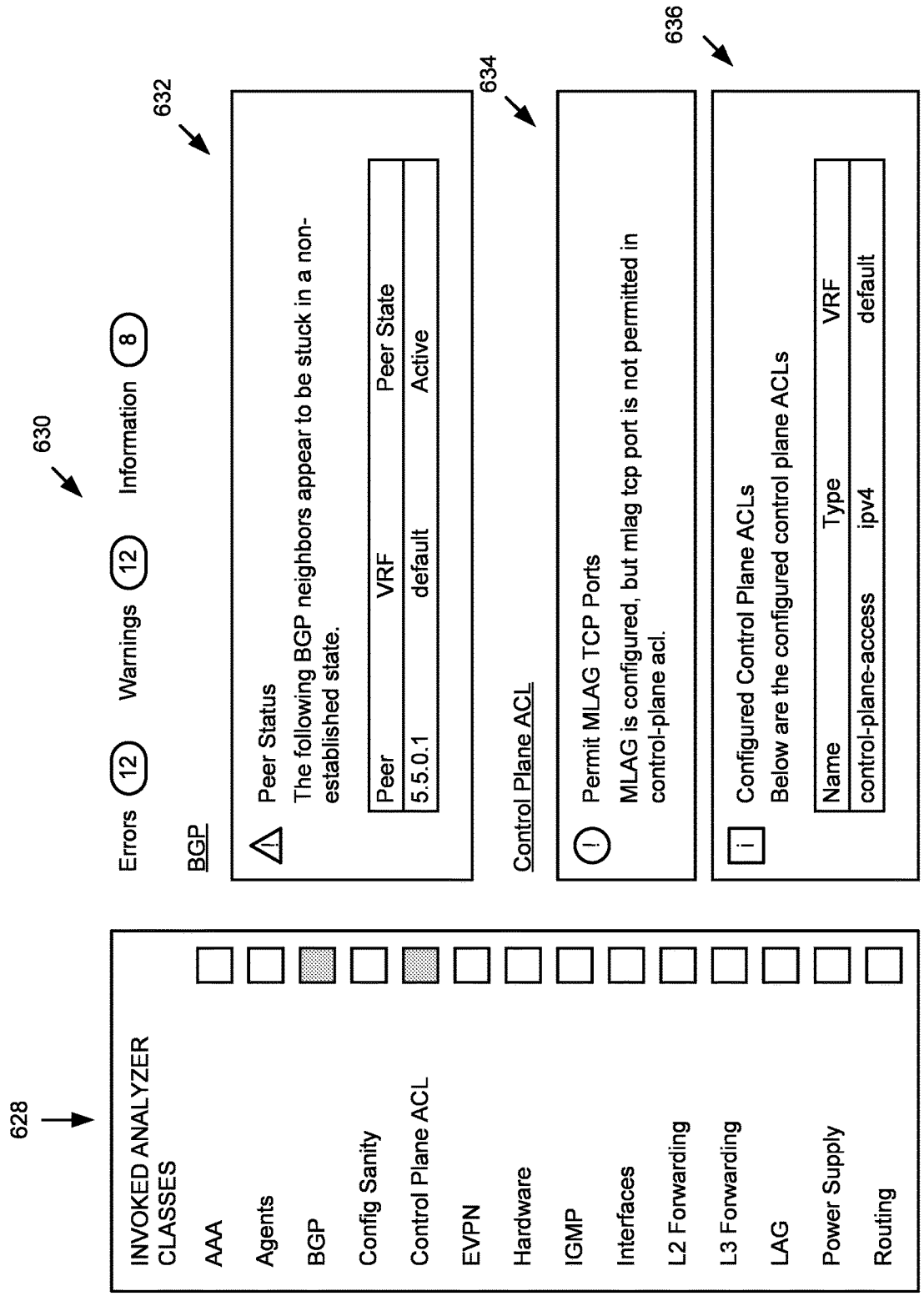
FIG. 6G shows an exemplary graphical user interface for viewing analyzer results in accordance with one or more embodiments disclosed herein.

Turning to FIG. 6G, the other GUI (also referred to hereinafter as the other exemplary GUI) includes an invoked analyzer classes window (628). The invoked analyzer classes window (628) represents a space where an analyzer class subset, of a set of analyzer classes, is listed. In the exemplary invoked analyzer classes window (628) shown herein, a number of analyzer classes mapped to a number of network device features (e.g., AAA, Agents, BGP, Config Sanity, Control Plane ACL, EVPN, etc.), respectively, found to be enabled on the affected network device are displayed. Further, each analyzer class, and thus each enabled network device feature, is linked to a corresponding check box also presented in the invoked analyzer classes window (628). Any highlighted, colored, or otherwise emphasized check box(es), respective to one or many analyzer class(es) of the analyzer class subset and/or to one or many enabled network device feature(s) (i.e., BGP, Control Plane ACL), is/are associated with analyzer result(s) triggering an error, a warning, and/or useful information.

The other exemplary GUI further includes a set of static text fields (630). The set of static text fields (630) each represent a text field, presenting information that cannot be altered by the admin. In the exemplary set of static text fields (630) shown herein, six immutable text fields are presented—i.e., a first text field displaying an "Errors" label; a second text field displaying a number of errors revealed by the analyzer result set produced for the affected network device; a third text field displaying a "Warnings" label; a fourth text field displaying a number of warnings revealed by the analyzer result set produced for the affected network device; a fifth text field displaying an "Information" label; and a sixth text field displaying a number of useful information details revealed by the analyzer result set produced for the affected network device.

The other exemplary GUI further includes a warning dialog box (632). The warning dialog box (632) represents a space where a warning is presented. In the exemplary warning dialog box (632) shown herein, the presented warning is relevant to a BGP network device feature (i.e., associated with the reported issue), and more specifically, discloses the peer status (i.e., stuck in a non-established state) of BGP neighbor network devices.

The other exemplary GUI further includes an error dialog box (634). The error dialog box (634) represents a space where an error is presented. In the exemplary error dialog box (634) shown herein, the presented error is relevant to a Control Plane ACL network device feature, and more specifically, discloses permissions (i.e., lack thereof in the control plane acl) associated with a multi-chassis link aggregation (MLAG) transmission control protocol (TCP) configured port. The exemplary error dialog box (634), in this case, may alert the admin to another issue (e.g., an unreported issue) impacting the affected network device.

The other exemplary GUI further includes an information dialog box (636). The information dialog box (636) represents a space where useful information is presented. In the exemplary information dialog box (636) shown herein, the presented useful information is relevant to a Control Plane ACL network device feature, and more specifically, discloses information respective to a control plane ACL configured on a network device.

In the above description of FIGS. 1-6G, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'connected' and/or 'connection' may be used to describe any direct and/or indirect connection between components. As used herein, the aforementioned phrases may refer to any direct connection (e.g., wired connection directly between two or more components) or any indirect connection (e.g., wired and/or wireless connection between any number of components connecting the connected components).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for analyzing network devices, the method comprising:

receiving, by a support document parser of a network service implemented on one or more servers and via a document upload interface of the network service, a support document associated with a network device;

parsing, by the support document parser, the support document to obtain interpreter-readable support data;

identifying, by a support data interpreter of the network service and from the interpreter-readable support data, a network device configuration of the network device, a network device state of the network device, and a network device log of the network device;

identifying, by the support data interpreter and based on the identified network device configuration, a network device functionality that is enabled on the network device;

storing, in an analyzer class database of the network service, a plurality of analyzer classes, each referencing a different group of analyzers usable to perform different checks pertaining to workings of a corresponding network device functionality;

selecting, by the support data interpreter, a given analyzer class in the plurality of analyzer classes that corresponds to the enabled network device functionality;

applying, by the support data interpreter, each of the checks referenced in the given analyzer class to the network device configuration, the network device state, and the network device log, to produce a set of analyzer results for the given analyzer class corresponding to the enabled network device functionality; and presenting, at an analysis interface of the network service, an error associated with the enabled network device functionality and identified by the set of analyzer results.

2. The method of claim 1, wherein the support document is received in connection with a reported issue concerning the network device and wherein the reported issue is triggered by the error associated with the enabled network device functionality.

3. The method of claim 2, further comprising:
presenting, at the analysis interface, a recommendation to resolve the reported issue.

4. The method of claim 3, further comprising:
presenting, at the analysis interface, a discovery of an unreported issue concerning the network device; and
presenting, at the analysis interface, a recommendation to resolve the unreported issue.

5. The method of claim 1, further comprising:
presenting user-understandable information representative of the set of analyzer results.

6. The method of claim 1, wherein the analyzer class database contains a plurality of entries, each mapping a network device functionality to a corresponding analyzer class in the plurality of analyzer classes.

7. The method of claim 6, wherein each analyzer class in the plurality of analyzer classes comprises at least one analyzer configured to perform a check relevant to the network device functionality mapped to the analyzer class.

8. The method of claim 7, wherein the set of analyzer results comprises an analyzer result produced through application of each analyzer of the at least one analyzer forming the given analyzer class.

9. The method of claim 1, wherein parsing the support document further obtains index-pertinent content used to update a search engine index and wherein the search engine index facilitates information retrieval from a support document database storing a corpus of support documents comprising the support document.

10. The method of claim 1, further comprising:
identifying network device connectivity information from the interpreter-readable support data.

11. The method of claim 10, further comprising:
generating a topology visualization based on the network device connectivity information, wherein the topology visualization comprises a device-centric connected graph focused around the network device and connections from the network device to a set of neighbor network devices.

12. The method of claim 11, further comprising:
presenting the topology visualization.

13. The method of claim 10, further comprising:
receiving a second support document associated with a second network device;
parsing the second support document to obtain second interpreter-readable support data;
identifying, from the second interpreter-readable support data, a second network device configuration of the second network device, a second network device state of the second network device, and a second network device log of the second network device;
identifying, based on the identified second network device configuration, a second network device functionality that is enabled on the second network device;
selecting a second analyzer class in the plurality of analyzer classes that corresponds to the enabled second network device functionality;
applying each of the checks referenced in the second analyzer class to the second network device configuration, the second network device state, and the second network device log, to produce a second set of analyzer results for the second analyzer class corresponding to the enabled second network device functionality; and
presenting a second error associated with the enabled second network device functionality and identified by the second set of analyzer results.

14. The method of claim 13, further comprising:
identifying second network device connectivity information from the second interpreter-readable support data.

15. The method of claim 14, further comprising:
generating a topology visualization based on the network device connectivity information and the second network device connectivity information, wherein the topology visualization comprises a subset-centric connected graph focused around the network device and the second network device, connections between the network device and the second network device, and connections from each of the network device and the second network device to a respective set of neighbor network devices.

16. A network service comprising:
storage implementing an analyzer class database comprising a plurality of mappings, each mapping associating a network device feature to a corresponding analyzer class that contains a set of analyzers that checks the associated network device feature for possible errors;
a computer processor connected to the storage and comprising circuitry; and
a support data interpreter executing on the computer processor and configured to:
obtain interpreter-readable support data derived from a support document associated with a network device;
identify, from the interpreter-readable support data, a network device configuration of the network device, a network device state of the network device, and a network device log of the network device;
identify, based on the identified network device configuration, a network device feature that is enabled on the network device;
select, based on the enabled network device feature and from the plurality of mappings stored in the analyzer class database, a given analyzer class that maps to the enabled network device feature based on a given one of the plurality of mappings; and
apply, using each analyzer of a given set of analyzers of the given analyzer class, a corresponding check to the network device configuration, the network device state, and the network device log, to produce set a of analyzer results for the given analyzer class mapping to the enabled network device feature;

store, in a results database implemented on the storage, the set of analyzer results for the given analyzer class mapping to the enabled network device feature.

17. The network service of claim 16, wherein the enabled network device feature is a border gateway protocol (BGP) feature and wherein the given set of analyzers of the given analyzer class specifies checks for the BGP feature.

18. The network service of claim 17, wherein the specified checks for the BGP feature comprise checks pertaining to a configuration of BGP on the network device.

19. The network service of claim 17, wherein the specified checks for the BGP feature comprise a check pertaining to BGP neighbors.

20. A non-transitory computer readable medium (CRM) comprising computer readable program code, which when executed by a computer processor, enables the computer processor to perform a method for analyzing network devices, the method comprising:

receiving a support document associated with a network device;

identifying, from the support document, a network device configuration of the network device, a network device state of the network device, and a network device log of the network device;

identifying, based on the identified network device configuration, a border gateway protocol (BGP) feature that is enabled on the network device;

storing a plurality of analyzer classes, including a given analyzer class for the BGP feature, wherein the given analyzer class includes a set of analyzers usable to perform BGP-specific checks to the network device configuration, the network device state, and the network device log; and selecting, for the enabled BGP feature and from the plurality of analyzer classes, the given analyzer class for the BGP feature;

applying each of the BGP-specific checks to the network device configuration, the network device state, and the network device log, to produce corresponding results of the BGP-specific checks for the enabled BGP feature; and presenting an error associated with the enabled BGP feature and identified by the results of the BGP-specific checks.

\* \* \* \* \*